US010811038B1

(12) United States Patent
Peng et al.

(10) Patent No.: US 10,811,038 B1
(45) Date of Patent: Oct. 20, 2020

(54) HEAT-ASSISTED MAGNETIC RECORDING HEAD HAVING NEAR-FIELD TRANSDUCER WITH NANOROD AND DIFFUSION BARRIER PLATE

(71) Applicant: Seagate Technology LLC, Cupertino, CA (US)

(72) Inventors: Chubing Peng, Eden Prairie, MN (US); Michael Allen Seigler, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/597,935

(22) Filed: Oct. 10, 2019

Related U.S. Application Data

(60) Provisional application No. 62/796,123, filed on Jan. 24, 2019, provisional application No. 62/746,756, filed on Oct. 17, 2018.

(51) Int. Cl.
| | | |
|---|---|---|
| G11B 5/31 | (2006.01) | |
| G11B 5/33 | (2006.01) | |
| G11B 5/115 | (2006.01) | |
| G11B 5/40 | (2006.01) | |
| G11B 5/187 | (2006.01) | |
| G11B 5/127 | (2006.01) | |
| G11B 5/00 | (2006.01) | |

(52) U.S. Cl.
CPC ............. *G11B 5/33* (2013.01); *G11B 5/115* (2013.01); *G11B 5/1278* (2013.01); *G11B 5/1878* (2013.01); *G11B 5/314* (2013.01); *G11B 5/3133* (2013.01); *G11B 5/40* (2013.01); *G11B 2005/0021* (2013.01)

(58) Field of Classification Search
CPC .............................. G11B 5/3133; G11B 5/314
USPC ......................................... 360/125.3, 125.31
See application file for complete search history.

(56) References Cited

U.S. PATENT DOCUMENTS

| | | | |
|---|---|---|---|
| 8,514,673 B1 | 8/2013 | Zhao et al. | |
| 8,988,827 B1* | 3/2015 | Balamane ............... | G11B 5/314 360/125.31 |
| 9,099,112 B1* | 8/2015 | Balamane ............... | G11B 5/314 |
| 9,300,557 B2 | 4/2016 | Zhao et al. | |
| 9,336,800 B2 | 5/2016 | Wessel et al. | |
| 9,799,352 B1 | 10/2017 | Chen et al. | |
| 9,852,752 B1* | 12/2017 | Chou ................... | G11B 5/3163 |
| 9,881,638 B1* | 1/2018 | Vossough ............. | G11B 5/6088 |
| 10,332,553 B1* | 6/2019 | Staffaroni ............ | G11B 5/6082 |
| 10,490,221 B1* | 11/2019 | Chen ..................... | G11B 13/08 |
| 2014/0050058 A1 | 2/2014 | Zou et al. | |
| 2014/0313872 A1 | 10/2014 | Rawat et al. | |
| 2016/0351209 A1* | 12/2016 | Chen ..................... | G11B 5/3116 |
| 2016/0351214 A1 | 12/2016 | Kautzky et al. | |
| 2016/0351221 A1 | 12/2016 | Blaber et al. | |
| 2017/0221505 A1* | 8/2017 | Staffaroni ........... | G11B 5/6088 |
| 2018/0158473 A1* | 6/2018 | Gorantla ............... | G11B 5/314 |

(Continued)

*Primary Examiner* — Jefferson A Evans
(74) *Attorney, Agent, or Firm* — Mueting Raasch Group

(57) ABSTRACT

A heat-assisted magnetic recording head includes a write pole tip that extends to a media-facing surface and a heat sink that is thermally coupled to a side of the write pole tip. A surface plasmonic plate is in contact with a side of the heat sink that faces away from the write pole and is recessed from, the media-facing surface. A nanorod extends from a surface of the surface plasmonic plate and towards the media-facing surface.

20 Claims, 15 Drawing Sheets

(56) References Cited

U.S. PATENT DOCUMENTS

| | | | |
|---|---|---|---|
| 2018/0211686 A1* | 7/2018 | Nishimura | G11B 5/6088 |
| 2018/0261240 A1* | 9/2018 | Blaber | G11B 5/314 |
| 2019/0066722 A1* | 2/2019 | Maletzky | G11B 5/314 |

* cited by examiner

HEAT-ASSISTED MAGNETIC RECORDING HEAD HAVING NEAR-FIELD TRANSDUCER WITH NANOROD AND DIFFUSION BARRIER PLATE

This application claims the benefit of Provisional Patent Application Ser. No. 62/796,123 filed on Jan. 24, 2019 and Provisional Patent Application Ser. No. 62/746,756 filed on Oct. 17, 2018, both of which are hereby incorporated herein by reference in their entireties.

SUMMARY

The present disclosure is directed to a heat-assisted magnetic recording head having a near-field transducer with a nanorod and diffusion barrier plate. In one embodiment, a recording head includes a write pole tip that extends to a media-facing surface and a heat sink that is thermally coupled to a side of the write pole tip. A surface plasmonic plate is in contact with a side of the heat sink that faces away from the write pole and is recessed from, the media-facing surface. A plasmonic diffusion barrier plate is on a side of the surface plasmonic plate that faces away from heat sink. A nanorod extends from a surface of the plasmonic diffusion barrier plate that faces away from the surface plasmonic plate, the nanorod extending towards the media-facing surface.

In another embodiment, a recording head has a write pole tip that extends to a media-facing surface. A heat sink is thermally coupled to a side of the write pole tip between the write pole tip and the waveguide core. A near-field transducer has a nanorod extending towards the media-facing surface that is stacked on a surface plasmonic plate of the near-field transducer. The surface plasmonic plate is in contact with the heat sink. The nanorod includes a body and a protrusion extending from an edge of the body that faces away from the media-facing surface. The protrusion has a downtrack thickness that is less than that of the body. The protrusion is absorbed into the body in response to a high temperature and reducing a recess of the body from the media-facing surface in response to the high temperature.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
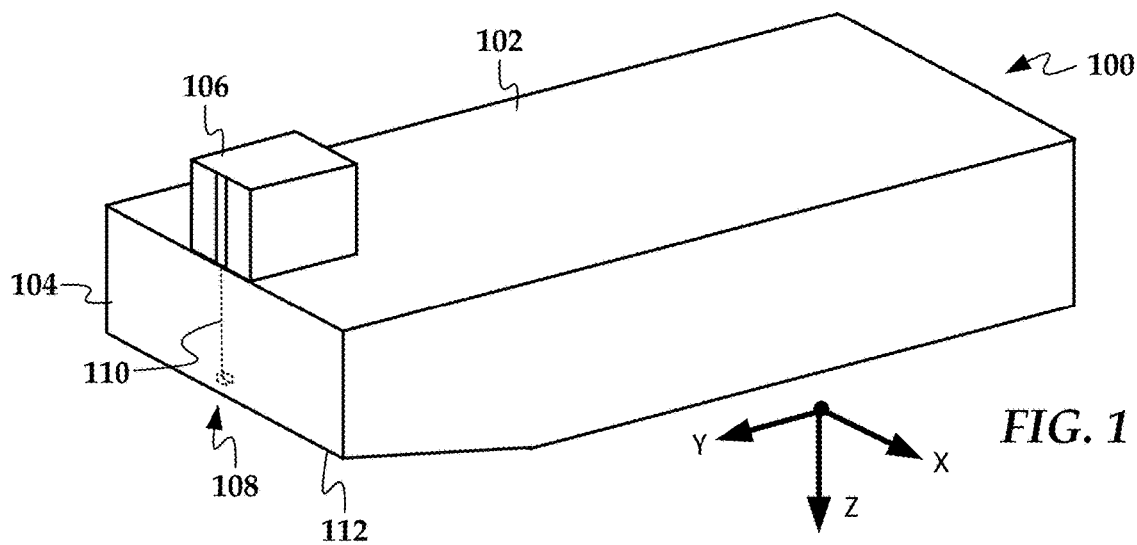
FIG. 1 is a perspective view of a slider assembly according to an example embodiment.

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a tiny optical spot in a recording layer, which raises the media temperature locally, reducing the writing magnetic field required for high-density recording. A waveguide delivers light to the near-field transducer and excites the near-field transducer.

Light from a light source, such as an edge-emitting laser diode, is coupled into a HAMR waveguide through waveguide input coupler or a spot size converter. In current configurations, the laser diode is mounted on a magnetic slider in such a way that a transverse electric (TE) polarized light source excites a TE waveguide mode in the slider waveguide while a transverse magnetic (TM) polarized light source excites a TM waveguide mode. The NFT is designed to adapt the light delivery.

There are generally two types of near field transducers, one uses a sub-wavelength metallic aperture (for instance, C-aperture, plasmonic gap waveguide) and the other one uses an optical antenna with a protruded tip (peg). A near field transducer utilizes the excitation of local surface-plasmon (LSP) at the interface between a plasmonic metal of free electrons and a dielectric material. On resonance, the optical energy from a light delivery dielectric waveguide can be concentrated into a local volume. Field-line concentration occurs at a local shape singularity, such as a gap or a tip, due to the collective oscillations of electrons in the metal, which increases the interaction between light and matter.

One major obstacle that prevents practical applications of such an NFT is reliability. A near-field transducer that interacts with light to generate a confined hot spot in a recording media also absorbs light, resulting in temperature rise of the NFT that degrades the NFT performance. One way to combat this type of failure is to use a mechanically robust plasmonic material of high melting temperature, such as Rh, Ir, and Pt, as the peg layer. Unfortunately, these materials are usually of high plasmonic loss and low thermal conductivity. Moreover, to obtain high thermal gradient (>10 K/nm), thermal background (from far-field excitation light and near-field light of the NFT except for the peg) is removed and only the near field from the peg will heat a recording media. This results in large temperature rise at the peg tip (for instance, >400° C.), causing head failure from, for example, peg deformation, peg oxidation, material separation, head overcoat removal, and dielectric material recess and corrosion.

Gold (Au) is a low-loss plasmonic material, interacting with light efficiently. It also has high thermal conductivity but low melting temperature. An Au NFT that includes an enlarged portion and a protruded peg is not mechanically stable. The Au peg will recess from the media-facing surface, partially due to the low density of Au fabricated from deposition or sputtering, resulting in NFT failure. Previous studies showed that an Au nanorod buried in a dielectric material could preserve its shape at high annealing temperature. For HAMR application, a NFT of Au nanorod still requires heat-dissipation by heat conduction through another metal(s). This brings challenge to efficiently excite the surface plasmon of an Au nanorod.

To address these issues, a practical near-field transducer with a protruded isolated nanorod is described hereinbelow. A low-loss surface plasmonic nanorod is attached to the bottom of a low-loss surface plasmonic plate, separated by a mechanically robust plasmonic diffusion barrier layer. The near-field transducer is excited by a transverse magnetic waveguide mode ($TM_{00}$). Using both transverse and longitudinal resonances of the nanorod and funnel coupler, as well as optical side shields, the near-field transducer is efficient and yields high thermal gradient (TG), e.g., >12K/nm along both down- and cross-track direction for an Au nanorod of 41 nm wide at 510 kpti on one media. This NFT design also exhibits low head temperatures (<170° C.), low laser power needed for writing (~4 mW) as well as low adjacent track erasure (ATE<46%) at large opening of the optical side shield.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, head, write head, read head, recording head, etc. The read/write head 100 has a slider body 102 with read/write transducers 108 at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducers 108. These HAMR components include an energy source 106 (e.g., laser diode) and a waveguide 110. The waveguide 110 delivers electromagnetic energy from the energy source 106 to a near-field transducer (NFT) that is part of the read/write transducers 108. The NFT achieves surface plasmon resonance and directs the energy out of a media-facing surface 112 to create a small hot spot in the recording medium.

Figure 2:
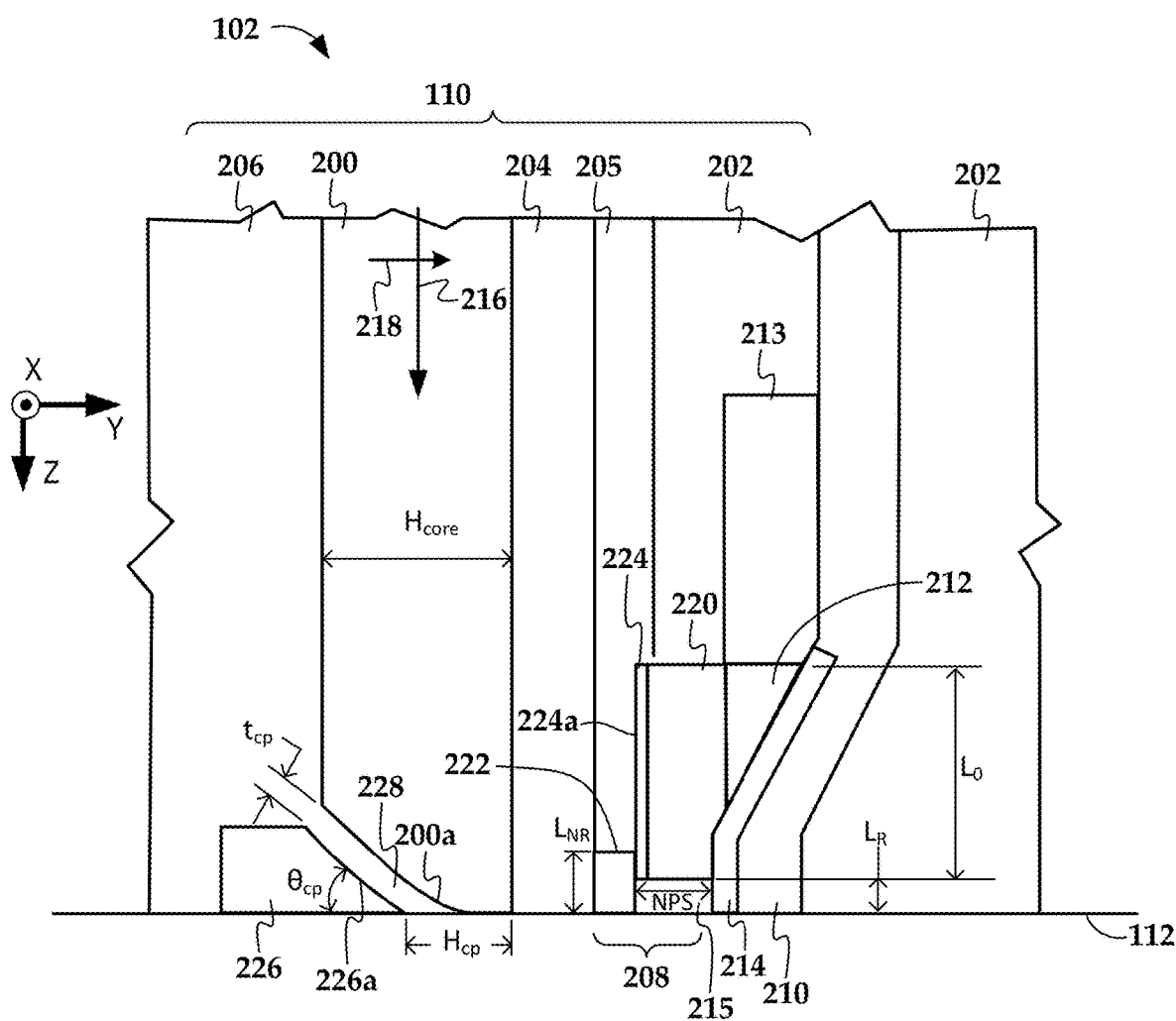
FIG. 2 is a cross-sectional view of a slider along a down-track plane according to according to an example embodiment.
Figure 3:
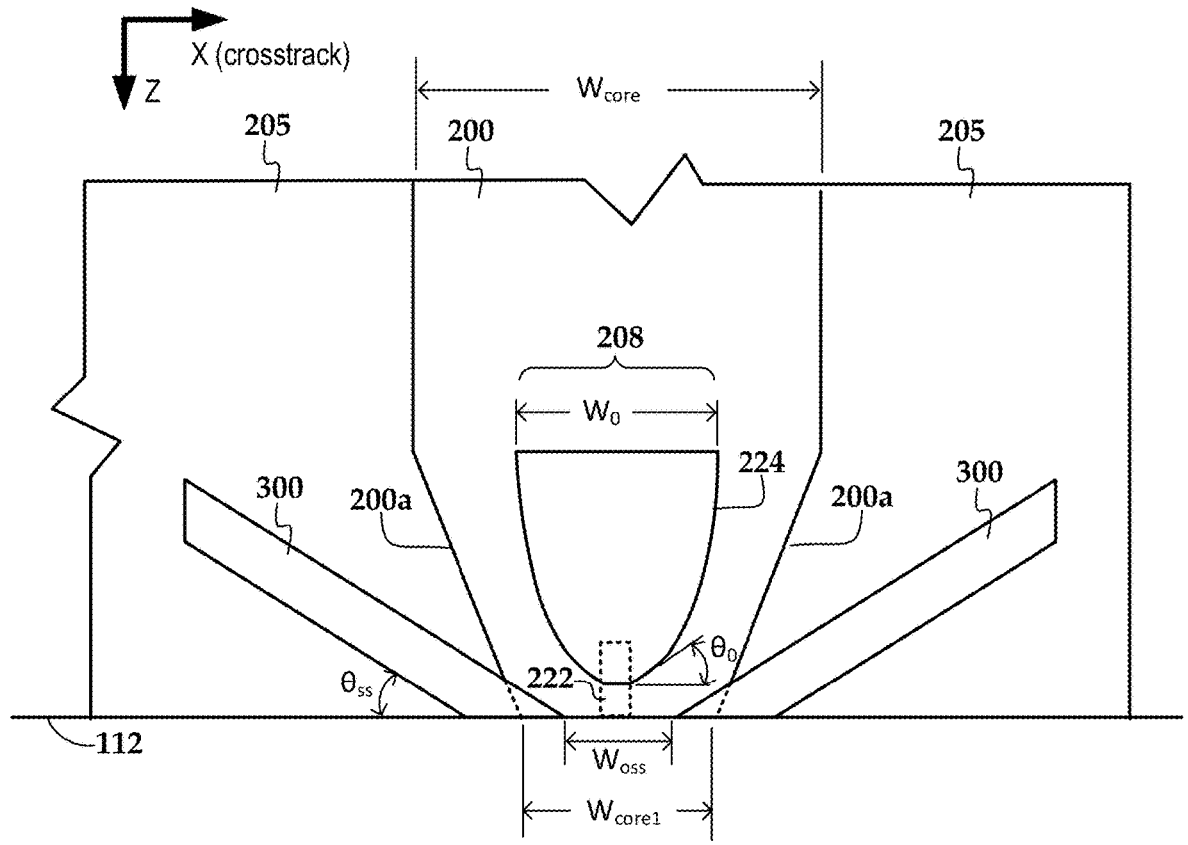
FIG. 3 is a wafer plane view of a slider according to an example embodiment.

In FIGS. 2 and 3, cross-sectional views show details of a slider body 102 according to an example embodiment. As best seen in FIG. 2, the waveguide 110 includes a core 200, top cladding layer 202, middle cladding layers 204, 205, and bottom cladding 206. An NFT 208 is placed in the middle cladding layer. The core 200 delivers light to an NFT 208 that is located within the middle cladding layer 204 at the media-facing surface 112. A write pole 210 (also referred to herein as a "magnetic pole") is located near the NFT 208. A heat sink 212 thermally couples the NFT 208 to the write pole 210, and a heat spreading plate 213 further diffuses heat. The heat spreading plate 213 could be separated from the write pole 210 by a dielectric material. A diffusion barrier 214 is shown between the heat sink 212 and the write pole 210. A magnetic coil (not shown) induces a magnetic field through the write pole 210 in response to an applied current. During recording, the NFT 208 forms a hotspot within a recording layer of a moving recording medium (not shown). The write pole 210 sets a magnetic orientation in the hotspot, thereby writing data to the recording medium.

Figure 4:
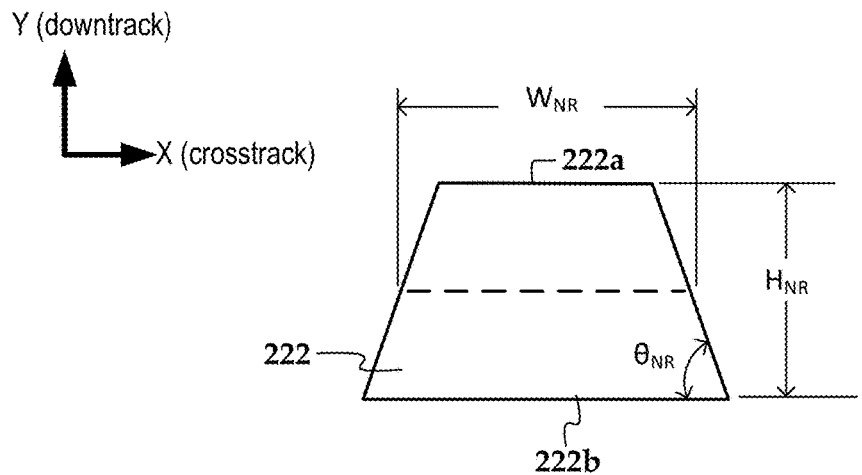
FIG. 4 is a media-facing surface view of the nanorod shown in FIGS. 2 and 3.

In this configuration, waveguide 110 is a three-dimensional dielectric waveguide that delivers light 216 with a fundamental transverse magnetic mode ($TM_{00}$) propagating along the waveguide core 200. The electric field is indicated by arrow 218. The NFT 208 includes a surface plasmonic plate (SP plate) 220 made of a low-loss plasmonic material, such as Au, Au-alloy, Ag, Cu, and a nanorod 222 of low-loss plasmonic material, such as Au, Au-alloy. To ease the fabrication, the SP plate 220 may be removed with some penalties in NFT efficiency and thermal gradient. In such a circumstance, the heat-sink 212 (and heat-spreading plate 213), which can be made of a material of low-loss plasmonic material, may also function as a surface plasmonic plate. The nanorod 222 has a constant cross-section along the z-direction, and is stacked on a mechanically robust metallic diffusion barrier plate 224, that is itself stacked on the SP plate 220. As shown, the diffusion barrier plate 224 is thinner than the SP plate 220, although in other embodiments it may be thicker than the SP plate 220, or the diffusion barrier plate 224 is directly attached on the heat sink 212 without a SP plate 220 in between. The nanorod 222 may have a trapezoidal cross-sectional shape on the media-facing surface, as seen in the diagram of FIG. 4. A dielectric spacer 215 is located between the nanorod 222, the plates 220, 224 and the diffusion barrier 214 and the write pole 210.

Figure 5:
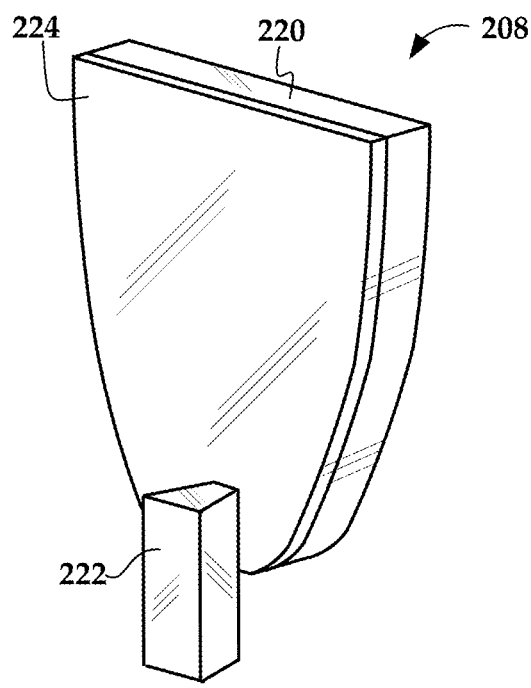
FIGS. 5, 6, 7A and 7B are perspective views of a near-field transducer to example embodiments.

The diffusion barrier plate 224 prevents void and material migration from the SP plate 220 to the nanorod 222 as well as between the nanorod 222 and the diffusion barrier plate 224. For efficient NFT excitation, the diffusion barrier plate 224 is preferably a plasmonic material, such Rh, Ir, Pt, Pd, metal nitrides (for instances, TiN, ZrN), graphene, etc. To remove the heat from the nanorod 222 caused by light absorption, the diffusion barrier plate 224 is preferably a good heat conductor. The diffusion barrier plate 224 usually follows the in-plane shape of the SP plate 220, which is seen in FIG. 3 and also in the perspective view of FIG. 5. But the diffusion barrier plate 224 could be made smaller than the SP plate 220, for instance, just above the nanorod 222, because the diffusion barrier plate 224 is usually lossier than the SP plate 220.

Figure 6:
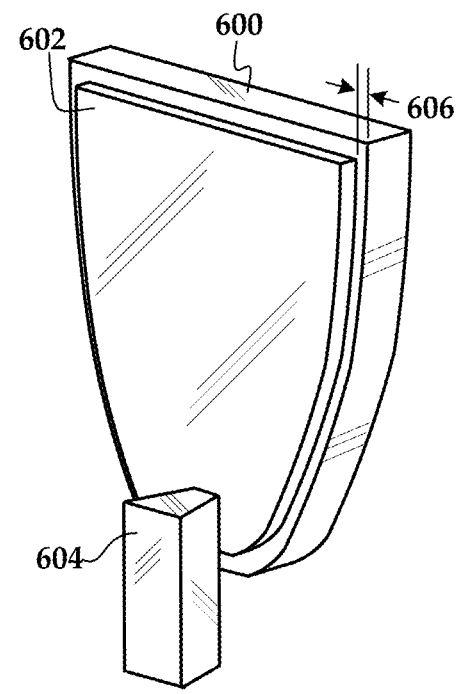
Figure 7A:
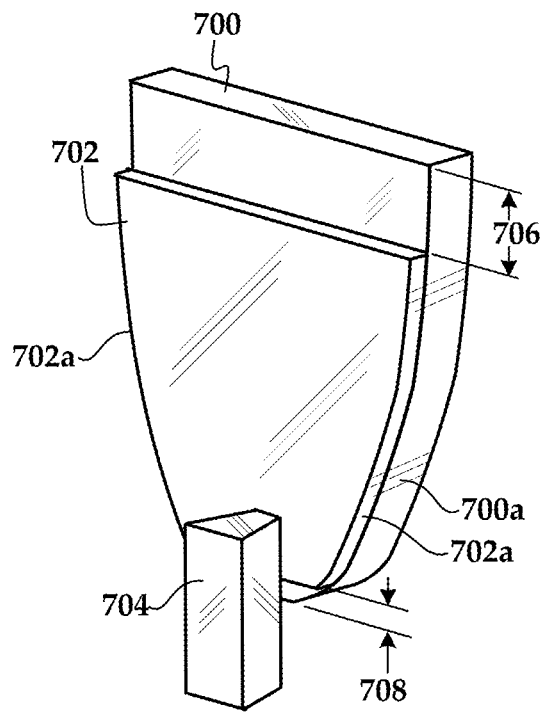
Figure 7B:
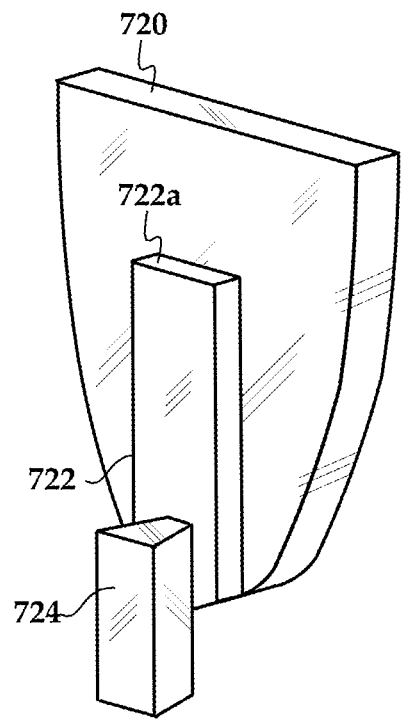

In FIGS. 6, 7A, and 7B, perspective views show respective SP plates 600, 700, 720, diffusion barrier plates 602, 702, 722 and nanorods 604, 704, 724. The diffusion barrier plate 602 in FIG. 6 has a perimeter shape similar to the SP plate 600, but is smaller such that there is a gap 606 around the perimeter of the plates 600, 602. The gap 606 may be the same all around the perimeter or different, e.g., on the sides and top/bottom. The diffusion barrier plate 702 in FIG. 7A has sides 702a that align with corresponding sides 700a of the SP plate 700. There are different-sized gaps 706, 708 between the respective wide and narrow ends of the plates 700, 702, although the gaps 706, 708 could be the same in other embodiments. The diffusion barrier plate 722 in FIG. 7B has an elongated, rectangular perimeter shape that is significantly smaller than that of the SP plate 720. The size of the barrier plate 722 near the nanorod 724 may be the same or slightly larger in a crosstrack direction than the nanorod 724, and its top edge 722a may extend more or less away from the media-facing surface.

In reference again to FIG. 2, the nanorod 222 is buried in a dielectric material 205, such as $SiO_2$ and $Al_2O_3$, and separated from the dielectric waveguide core 200 by a dielectric cladding 204. For purposes of resonance and temperature rise (due to light absorption) of the nanorod, it is preferred that the surrounding dielectric to have low index of refraction, such as $SiO_2$. But for purposes of stability, a dense dielectric such as $Y_2O_3$ (and therefore, high index of refraction) may be preferred. The compromise is to have a thin (e.g., <10 nm) dense dielectric surrounding the nanorod in both sides and bottom surface, sometimes called a liner, and then deposit a dielectric of low index of refraction. At the media-facing surface 112, it is protected by a thin (e.g., a few nanometers) head-overcoat layer on the media-facing surface. These features preserve the shape of the nanorod 222 during operation. Resonant coupling of this near-field transducer 208 with a $TM_{00}$ mode renders a short nanorod 222 ($L_{NR}$~50-120 nm at light wavelength λ~808 nm) and low light-induced temperature rise (<170° C.), mitigating recess from the media-facing surface 112.

Energy is condensed to the tip of the nanorod 222 through excitation of the SP/diffusion barrier plate 220, 224 in a form of surface-plasmon polariton (SPP) mode propagating at the bottom surface 224a of the plate 224 by a $TM_{00}$ waveguide mode. Light propagating in the dielectric waveguide is coupled into the hybrid plasmonic waveguide composed of the dielectric core 200 and a metal (213, 220, 224), separated by low-index claddings (204, 205, 202) between core and metal by butt-coupling. Note that the SPP mode is not diffraction-limited. It follows the shape of SP/diffusion barrier plate (from wide opening to narrow end). So the field is concentrated to the end of the SP/diffusion barrier plate 220, 224. If the diffusion barrier plate 224 is relatively thin compared with the SP plate 220, the light will mainly interact with the SP plate 220. However, if the SP plate 220 is relatively thin compared with the diffusion barrier plate 224, the light will mainly interact with the diffusion barrier plate 224. If the SP plate 220 is removed to ease the fabrication (with some penalties in performance), the presence of optical side shield 300 will force part of the heat sink 212 below the magnetic pole 210 becomes narrower toward the media-facing surface 112. In either case, the concentrated field excites the nanorod 222 attached at the bottom and near the end of the diffusion barrier plate 224.

Energy is also condensed to the tip of the nanorod 222 through longitudinal resonance of the nanorod (see, e.g., U.S. Pat. No. 8,699,307, filed on Mar. 7, 2013). It is confirmed that this resonance still appears in the presence of a high-loss plasmonic diffusion barrier 224. Also seen in FIG. 2 is a funnel coupler 226 that has a reflective surface 226a facing and separated from a downtrack-slanted surface 200a of the core 200 by a dielectric spacer 228. The funnel coupler 226 is made of a metallic material, such as a low-loss plasmonic material (such as Au), a high-loss plasmonic material (such as Rh, Ir, Pt), and a high-loss refractory metal (such as Ru). The material of the funnel coupler 226 can be chosen based on a desired reliability and performance target. To reduce the light absorption in the metal of the funnel coupler 226, a thin dielectric material of index of refraction lower than the waveguide core material, such as $SiO_2$ and $Al_2O_3$, may be used as the spacer 228. Due to the nature of metal and the $TM_{00}$ mode used for NFT excitation, light could be further squeezed to the nanorod for excitation via the funnel coupler 226.

A simulation of this configuration was performed using a waveguide having a $Ta_2O_5$ core 200 with index of refraction n=2.09, and with $Al_2O_3$ of n=1.63 used as the bottom cladding 206, top cladding 202 and dielectric spacer 215. The other middle cladding layers 204 and 205 can be formed of $SiO_2$ of n=1.46. The waveguide core 200 is 600-nm wide (along cross-track direction, $W_{core}$) and 400 nm thick (along down-track core, direction, $H_{core}$). Light wavelength is λ=808 nm. The material for the SP plate 220, nanorod 222, NFT heat-sink 212, and heat-spreading layer 213 is gold, n=0.19+j 5.39. The material for the diffusion barrier layer 224 and the funnel coupler 226 is Rh, n=2.72+j 6.85. The thermal conductivity is 40 W/m/K for the Rh and 165 W/m/K for the Au nanorod. The diffusion barrier 214 between the magnetic pole 210 and the NFT heat-sink 212 is a 15-nm thick Ir material, n=3.43+j 6.48.

The SP plate 220 has a parabolic-like in-plane shape with the dimension: $W_0$=400 nm and $L_0$=0.975 μm. The SP plate 220 is 80-nm thick along the down-track direction. The diffusion barrier plate 224 matches the shape of the SP plate 220 on the substrate-parallel plane (xz-plane) and is 10-nm thick. For efficient heat-sinking to the nanorod 222, the end (near the media-facing surface) of the SP/diffusion barrier plate 220, 224 is nearly circular, $\theta_0$~15°. Recess of the SP/diffusion barrier layer 220, 224 is $L_R$=45 nm. The nanorod 222 has a trapezoidal shape parallel to the media-facing surface, which will be explained below, with a dimension: $W_{NR}$=41 nm, $H_{NR}$=80 nm and $\theta_{NR}$=5°, as shown in FIG. 4. If a funnel coupler 226 is used, the setting is: $\theta_{cp}$=45°, $H_{cp}$=100 nm and $t_{cp}$=30 nm. The downtrack length of the dielectric spacer 215 between the diffusion barrier and the nanorod is NPS=15 nm, a parameter that strongly affects thermal gradient, TG.

As seen in FIG. 3, optical side shields (OSS) 300 may be used on either crosstrack side of the NFT 206. The OSS 300 uses Rh (or Ru) material and its opening at media-facing surface is $W_{OSS}$=182 nm at $\theta_{oss}$=30°. Note that the OSS 300 is intended to reduce the thermal background from the excitation waveguide, improving thermal gradient (TG) and not necessarily to improve NFT efficiency. The size of the opening $W_{OSS}$ is another parameter for TG. To reduce the light absorption in the OSS, the waveguide core is tapered down to $w_{core1}$=250 nm at the media-facing surface; see tapered crosstrack edges 200a in FIG. 3.

The media-facing surface 112 is coated with a 1-nm thick $Ta_2O_5$ layer and 1.5-nm thick a diamond-like-carbon layer. The storage media (not shown) has a 5-nm thick carbon-overcoat layer, a 10-nm thick FePt recording layer, a 12-nm thick interlayer, a heat-sink layer, and a soft magnetic layer on a glass substrate. The air gap between head and media is 3 nm.

Figure 8:
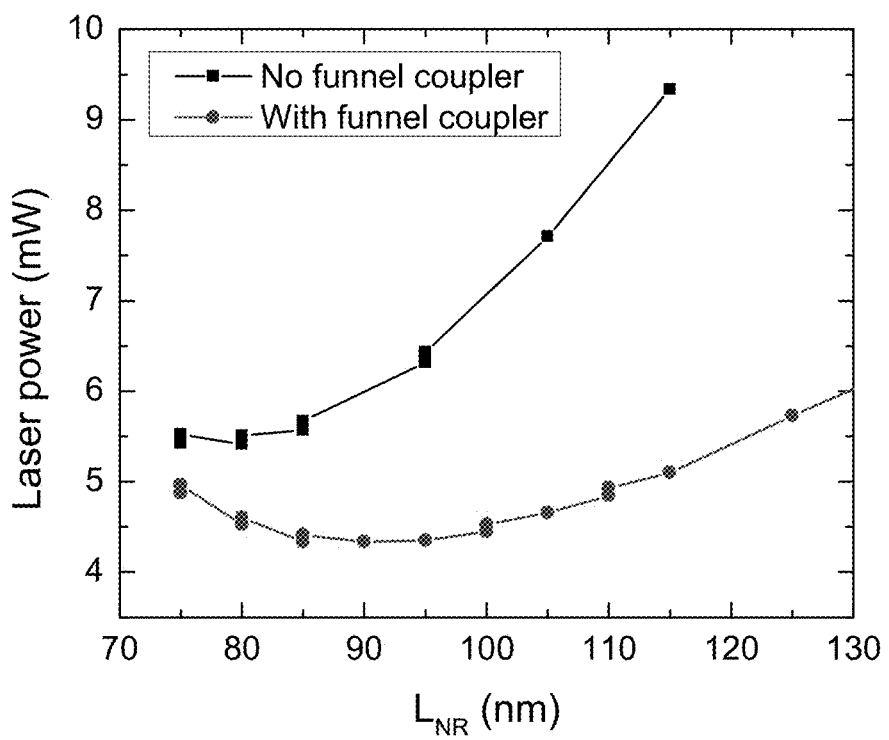
FIGS. 8-13 are graphs showing modeling results of a near-field transducer according to example embodiments.
Figure 9:
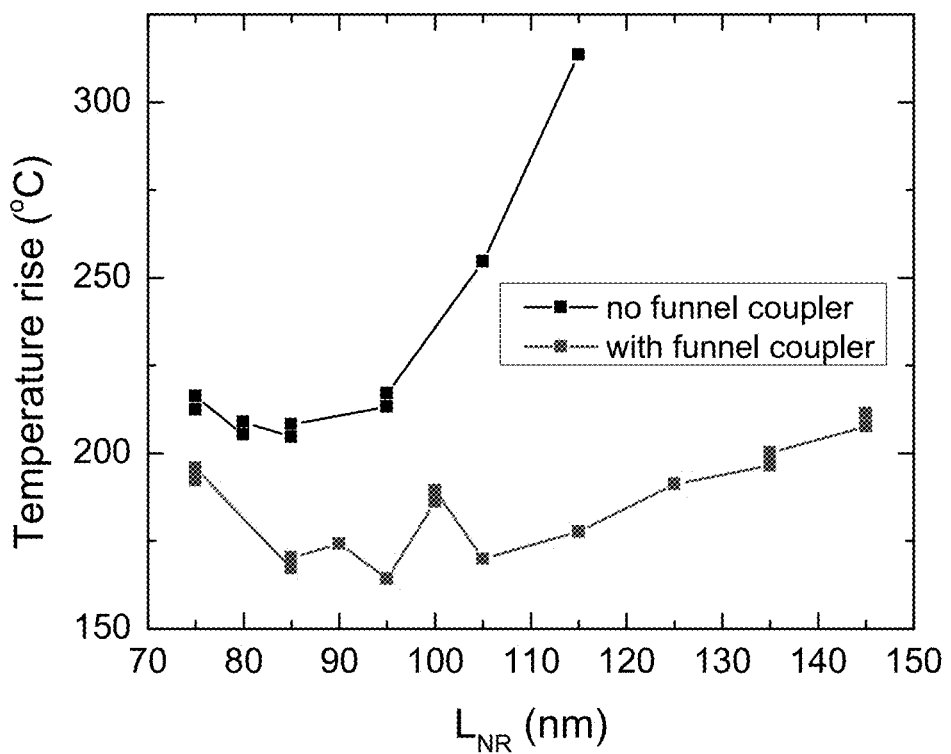
Figure 10:
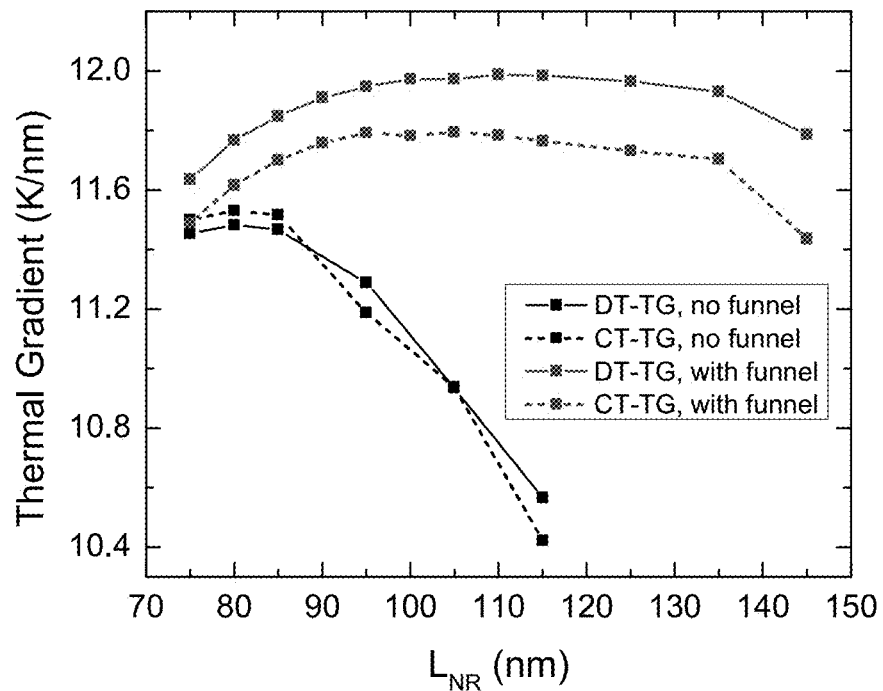
Figure 11:
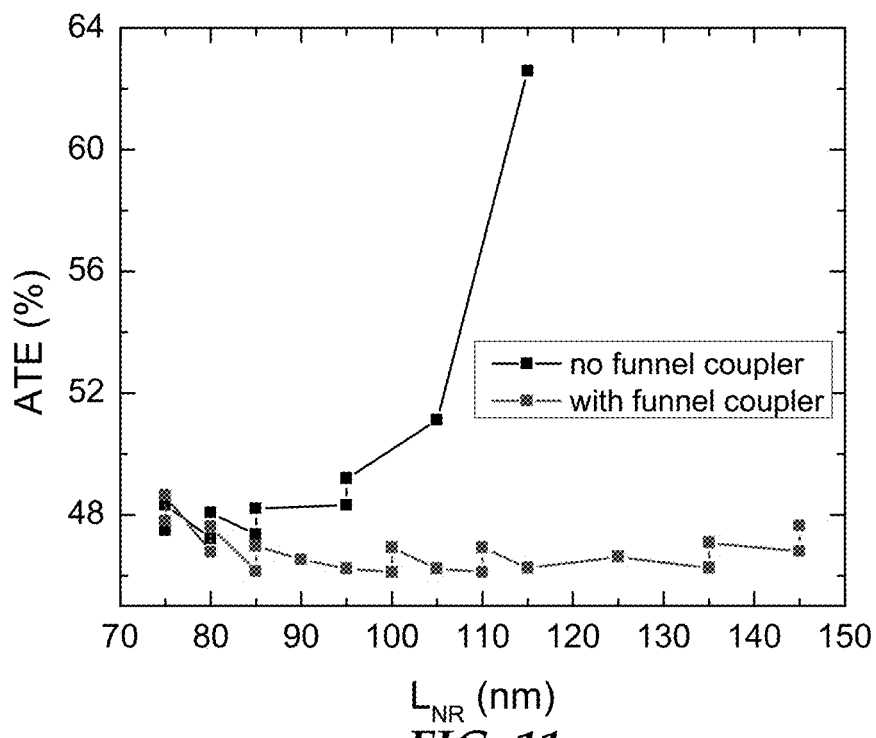

In FIGS. 8-11, graphs show the longitudinal resonance of the nanorod with and without the presence of a funnel coupler. The graph in FIG. 8 shows laser power needed for writing. The graph in FIG. 10 shows thermal gradient along down-track (DT-TG) and along cross-track (CT-TG). The graph in FIG. 9 shows temperature rise at the end of nanorod. The graph in FIG. 11 shows adjacent track erasure (ATE). In all of these graphs, a 50-nm track (510 kpti) is assumed. Some parameters assumed in this modeling are: pole-nanorod separation NPS=15 nm, disc recess $L_R$=45 nm, OSS opening $W_{oss}$=182 nm, and nanorod thickness $H_{NR}$=80 nm and width $W_{NR}$=41 nm. Good results are seen in the range of 120 nm≥$L_{NR}$≥70 nm, with or without the funnel coupler. Thus, compared to the disc recess in this example, the nanorod length may range from 3*$L_R$≥$L_{NR}$≥1.5 $L_R$, although for other examples, the nanorod length may have a wider range, e.g., 10*$L_R$>$L_{NR}$>$L_R$.

In the absence of a funnel coupler, the nanorod presents strong longitudinal resonance. The funnel coupler relaxes the resonance, enhancing the NFT efficiency (lower laser power needed for writing and lower adjacent track erasure), improving thermal gradient (by +0.5K/nm), and reducing the heads temperature (by ~30K). Without a funnel coupler, NFT excitation relies on the longitudinal resonance of the nanorod. A funnel coupler relaxes the dependence of the nanorod length, which is preferred for practical production. Overall, at OSS opening $W_{oss}$=182 nm, NPS=15 nm and nanorod width $W_{NR}$=41 nm, DT-TG=11.97K/nm, CT-TG=11.79K/nm, laser power needed=4.3 mW, ATE=46%, heads temperature rise <170K. The optimal nanorod is only ~100 nm.

Figure 12:
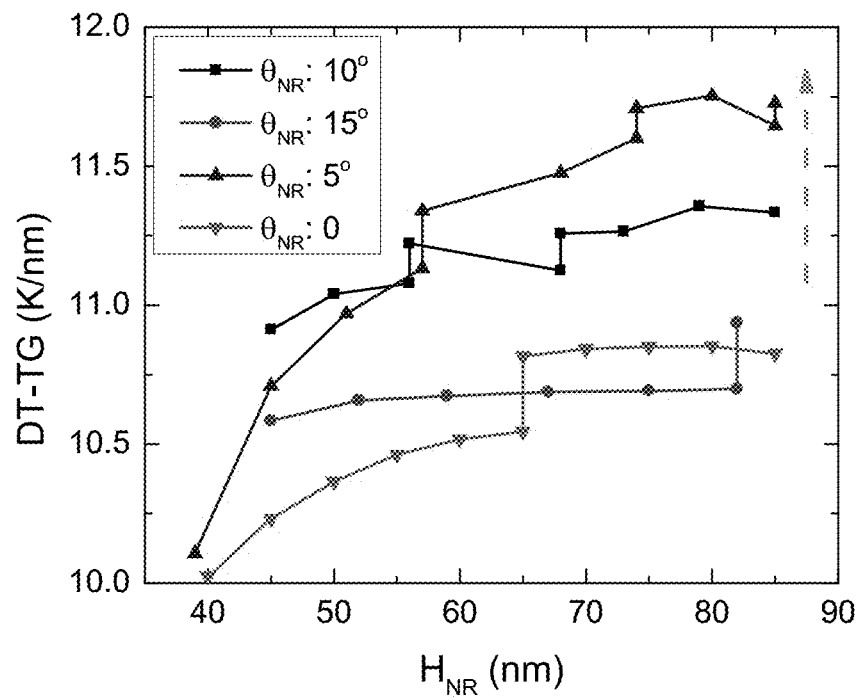
Figure 13:
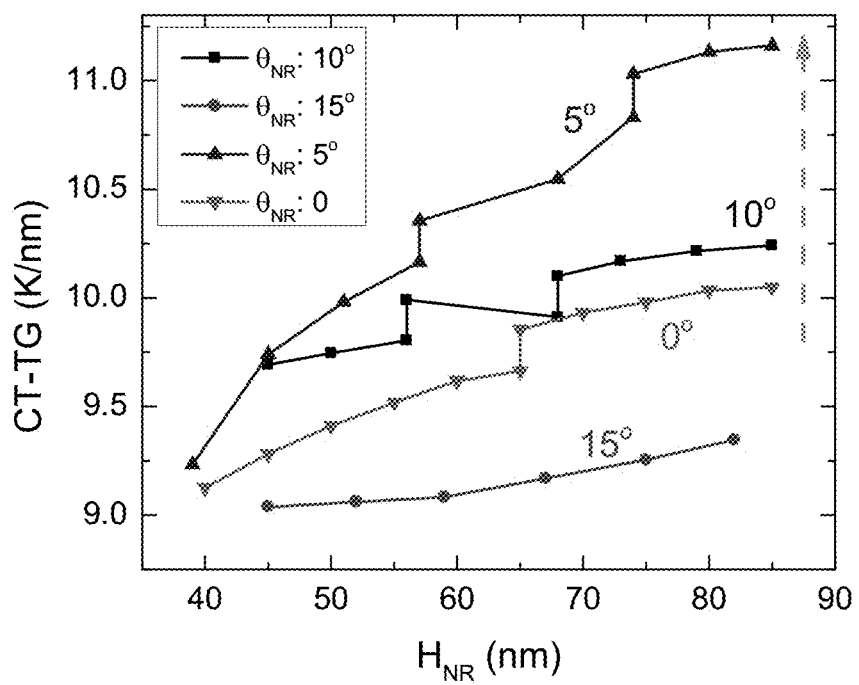

Thermal gradient is a key parameter for high density recording. The nanorod 222 is excited by a $TM_{00}$ waveguide mode, with the dominant electric field normal to the SP plate 220. If, as shown in FIG. 4, the nanorod 222 has a trapezoidal shape as projected onto the media-facing surface and its top surface 222a (in contact with the SP/diffusion barrier plate 220,224) is narrower than the bottom surface 222b (facing away from the SP/diffusion barrier plate 220,224), a transverse resonance exists, which pushes the oscillating electric charges to the top 222a of nanorod 222 for high thermal gradient. The graphs in FIGS. 12 and 13 show the calculated result, with the following parameters: pole-nanorod separation NPS=15 nm; disc recess $L_R$=45 nm; OSS opening $W_{oss}$=182 nm, and nanorod length $L_{NR}$=105 nm. In FIGS. 12 and 13, TG is plotted as a function of the nanorod thickness ($H_{NR}$) at four trapezoidal angles while the top width of nanorod is kept constant. High TG is obtained at $H_{NR}$≈80 nm and $\theta_{NR}$≈5° and on the current storage media used in the modeling.

To improve the thermal-gradient further, an OSS 300 may also be implemented in this configuration. For the NFT excitation using a $TM_{00}$ mode, the OSS 300 will cut down the dielectric waveguide mode for narrow opening at the media-facing surface. This will reduce the thermal background from the residual excitation light coupled into a recording media, increasing the thermal gradient. An OSS will not improve NFT efficiency and also leads to higher temperature rise in the heads. To mitigate this negative effort, the waveguide core is tapered to a narrow end, see $w_{core1} < W_{core}$ in FIG. 3, and the spacer between the OSS 300 and waveguide core 200 is filled with a dielectric material of lower index of refraction than that of the waveguide core 200, such as $Al_2O_3$, $SiO_2$.

Figure 14:
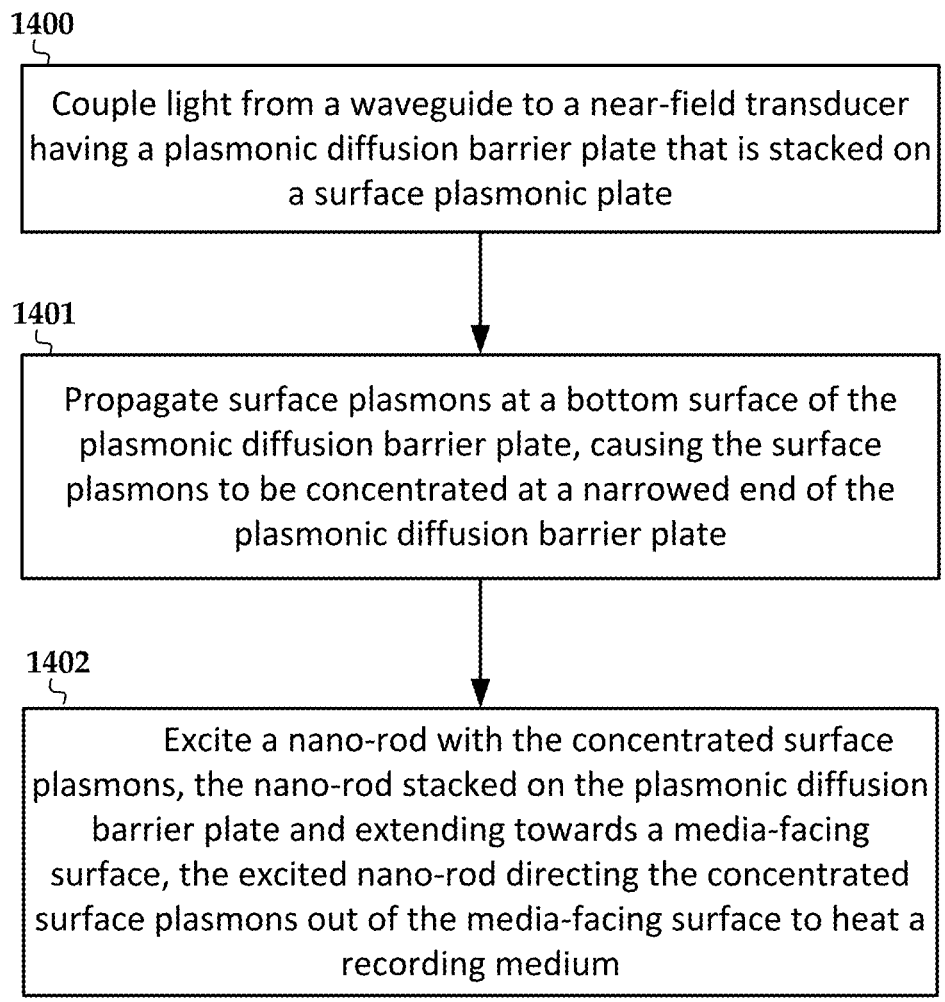
FIG. 14 is a flowchart of a method according to an example embodiment.

In FIG. 14, a flowchart shows a method according to an example embodiment. The method involves coupling 1400 light from a waveguide to a near-field transducer near a media-facing surface of a recording head. The near-field transducer has a plasmonic diffusion barrier plate that is stacked on a surface plasmonic plate on a plane normal to the media-facing surface. A bottom surface of the plasmonic diffusion barrier plate faces the waveguide and is formed of a material that is more mechanically robust than that of the surface plasmonic plate.

In response to the coupling of the light to the near-field transducer, surface plasmons are propagated 1401 at the bottom surface of the plasmonic diffusion barrier plate, causing the surface plasmons to be concentrated at a narrowed end of the plasmonic diffusion barrier plate that faces the media-facing surface. A nanorod is excited 1402 with the concentrated surface plasmons. The nanorod is stacked on the bottom surface of the plasmonic diffusion barrier plate and extends towards the media-facing surface. The excited nanorod directs the concentrated surface plasmons out of the media-facing surface to heat a recording medium.

The Au nanorod may be formed of multiple crystallites. Light-induced temperature rise in the nanorod or back heating from the recording media during operation causes the re-growth of the crystal grains. There might be also voids already trapped in the nanorod from film deposition, even after annealing at high temperatures such as laser-melting. During operation, these voids and grain boundary can migrate to the both ends of the nanorod, in particular, to the nanorod end at the media-facing surface, resulting in larger hot spot in the storage layer from the increasing separation between nanorod and media, which degrades the recording density.

One way to densify the nanorod could employ double-lapping. Initial lapping obtains a longer nanorod than the target, the target being the desired nanorod length for recording. By turning on the light source, the nanorod will absorb light and densify. The subsequent lapping reaches the desired nanorod length for operation.

In other embodiments, particular nanorod features can sink the voids in the nanorods from densification, thereby mitigating the nanorod recess (from the media-facing surface). These features, called a void-sink, in the nanorod can be recessed more easily than the nanorod end at the media-facing surface. A void-sink may be a protrusion such as a pointed/slanted structure (e.g., an angle <90°) located in a region where the Au is hot and where the design has a low sensitivity to this pointed structure recessing or rounding. The nanorod design provides freedom to mitigate the nanorod recess from media facing surface, such as laser melting or spot annealing. The protrusion has a downtrack thickness that is less than a body of the nanorod, and this protrusion is the first part of the nanorod that densities the rest of nanorod, thereby reducing recession at the media-facing surface.

Figure 15:
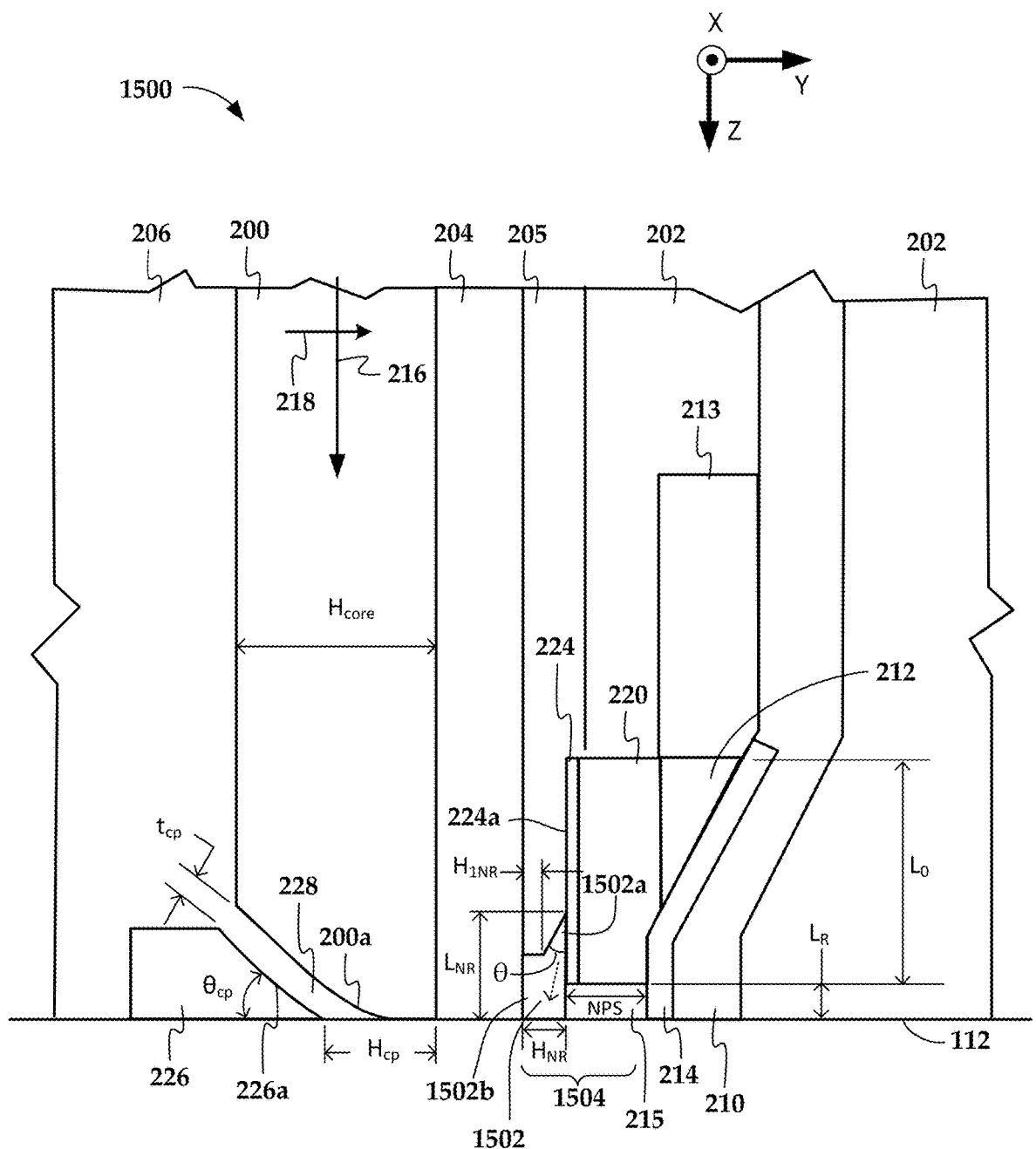
FIG. 15 is a cross-sectional view of a slider along a down-track plane according to according to another example embodiment.

In FIG. 15, a diagram shows an arrangement of a head 1500 according to an example embodiment. For purposes of convenience, some components in FIG. 15 have the same numbering as similar components in FIGS. 2 and 3, and so the description above is applicable to the types and configurations of those similar components unless otherwise noted. As seen in FIG. 15, an NFT 1504 has a nanorod 1502 with a slanted protrusion 1502a that extends along the diffusion barrier plate 224 and surface plasmon plate 220. At higher temperatures, from light absorption in the NFT 1504 or annealing, the sharp corner of the protrusion 1502a will recess first, indicated by a dashed arrow in the figure, leaving a void behind. In this way, the body 1502b of the nanorod 1502 is further densified and the recess of nanorod 1502 from media-facing surface 112 is mitigated.

To evaluate the approach, an simulation was performed using a waveguide formed of a $Ta_2O_5$ core with index of refraction n=2.09, $Al_2O_3$ of n=1.63 as the bottom, cladding 206, middle cladding 204, top cladding 202, and dielectric spacer 215. The middle cladding layer 205 and dielectric spacer 228 are formed of $SiO_2$ with n=1.46. The core, waveguide core 200 is 600-nm wide (along cross-track direction, $W_{core}$) and 400 nm thick (along down-track direction, $H_{core}$). Light wavelength $\lambda$=808 nm. The material for the SP plate 220, nanorod 1502, NFT heat-sink 212, and heat-spreading layer 213 is gold, n=0.19+j 5.39. The material for the diffusion barrier layer 224 and the funnel coupler 226 is Rh, n=2.72+j 6.85. The thermal conductivity is 40 W/m/K for the Rh and 165 W/m/K for the Au nanorod. The diffusion barrier 214 between the magnetic pole and the NFT heat-sink is a 15-nm thick Ir material, n=3.43+j 6.48.

The SP plate 220 has a parabolic-like in-plane shape with the dimension: $W_0$=400 nm and $H_0$=0.975 μm (see FIG. 3). The SP plate 220 is 80-nm thick (along down-track direction). The diffusion barrier plate 224 follows the shape of the SP plate 220 and is 10-nm thick. For efficient heat-sinking to the nanorod 1502, the end of the SP/diffusion barrier plate 220, 224 near the media-facing surface 112 is nearly circular, $\theta_0$~10°. Recess of the SP/diffusion barrier layer 220, 224 and NFT heat-sink 212 is $L_R$=TPH−5 nm, TPH=45 nm. The nanorod 1502 has a trapezoidal shape parallel to the media-facing surface with a dimension: $W_{NR}$=28 nm, $H_{NR}$=67 nm and $\theta_{NR}$=5° (see FIG. 4 for analogous dimensions of nanorod 222).

The funnel coupler 226 has $\theta_{cp}$=45°, $H_{cp}$=100 nm and $t_{cp}$=30 nm. The dielectric spacer 215 between the diffusion barrier and the nanorod is: NPS=15 nm, parameter that is controlled to achieve high thermal gradient. As shown in FIG. 3, the OSS 300 also uses Rh material and has opening at media-facing surface is $W_{OSS}$=170 nm (another parameter that influences thermal gradient) at $\theta_{oss}$=30°. To reduce the light absorption in the OSS 300, the waveguide core 200 is tapered down to $w_{core1}$=250 nm at the media-facing surface 112. The magnitude of $w_{core1}$ is not considered a critical parameter in performance. The calculated result assumes 38 nm track pitch.

The media-facing surface 112 is coated with a 1 nm thick dielectric layer (n=2.2) and 2.7 nm thick $SiO_2$ buildup layer, called HOC. The storage media (not shown) includes a 2.8 nm thick carbon-overcoat layer (COC), a 12 nm thick FePt recording layer, a 11 nm thick interlayer, a 51 nm heat-sink layer, and a soft magnetic layer on a glass substrate. There is 1 nm lubricated layer between HOC and COC, functioning as an air gap in the thermal modeling.

Figure 16:
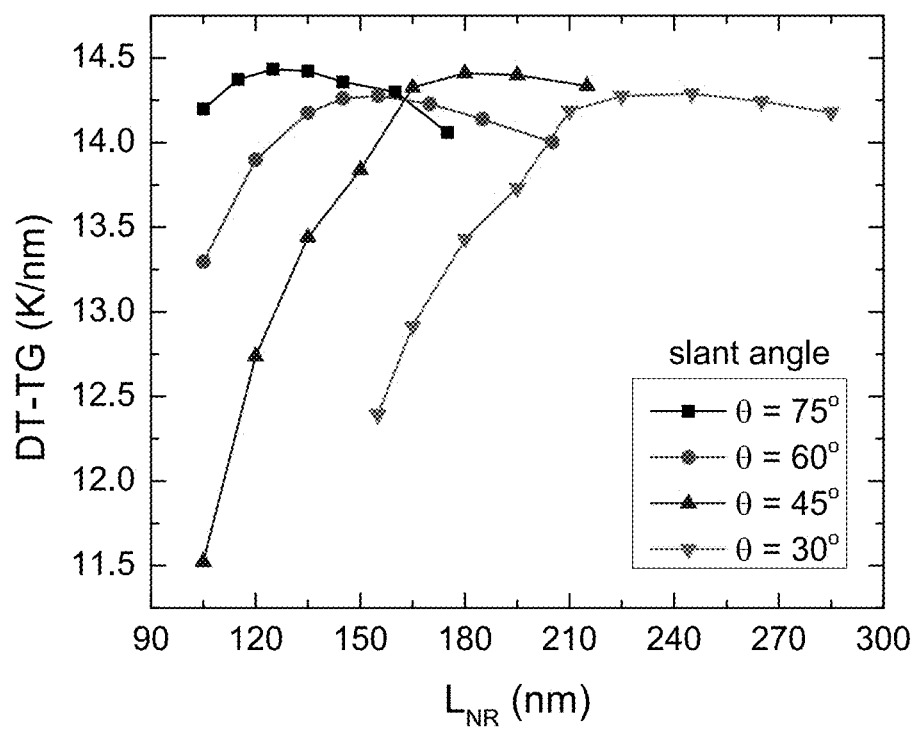
FIGS. 16-21 are graphs showing modeling results of the near-field transducer shown in FIG. 15.
Figure 17:
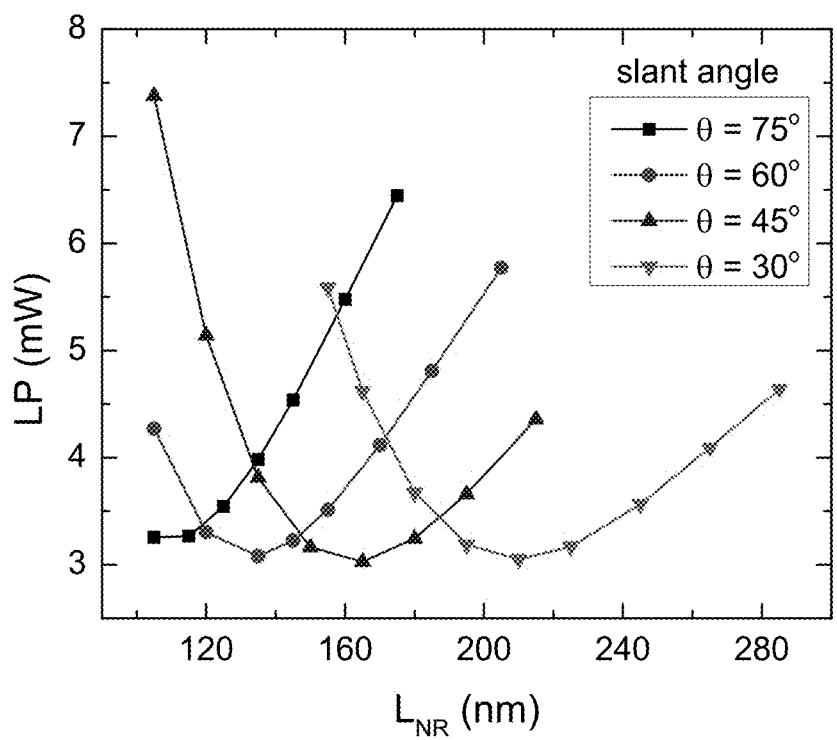
Figure 18:
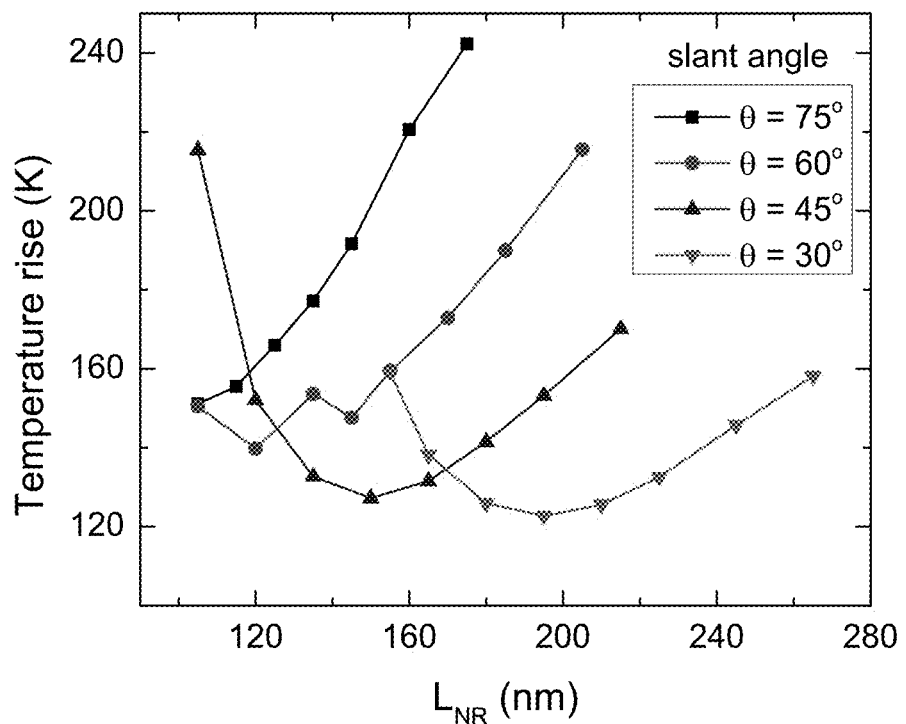
Figure 19:
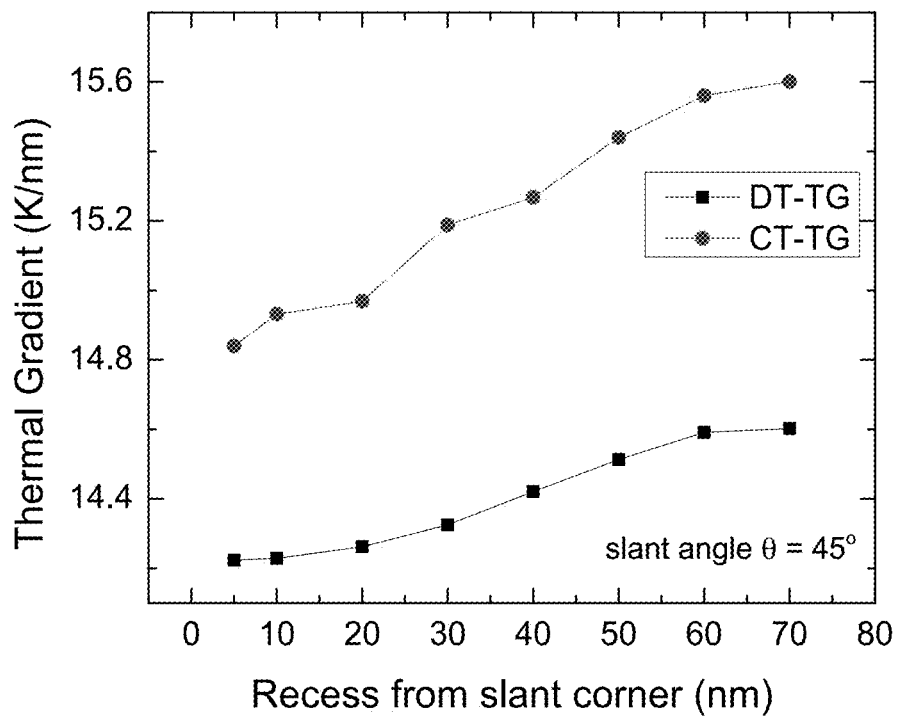
Figure 20:
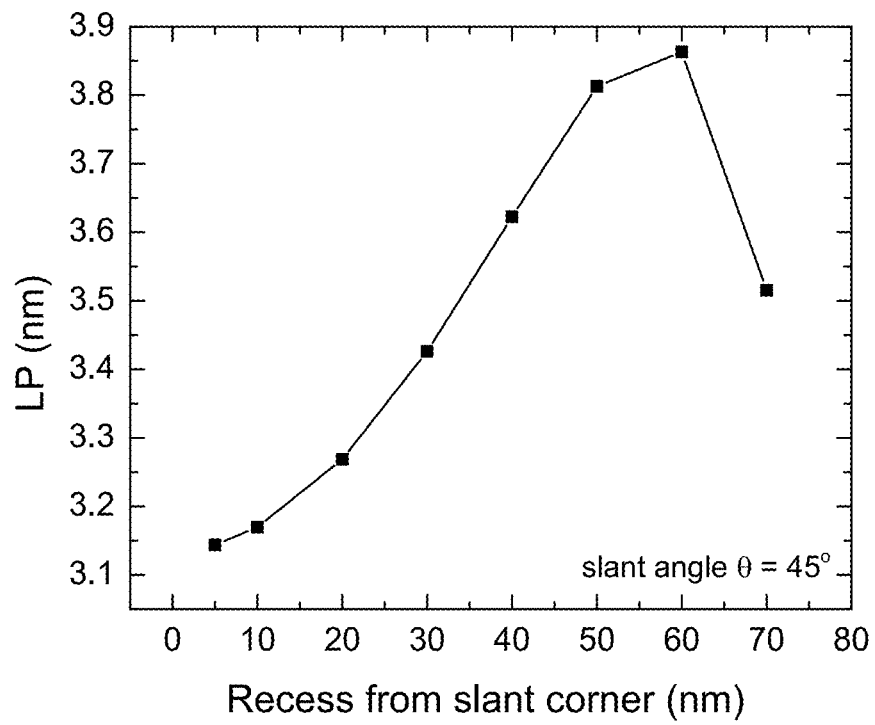
Figure 21:
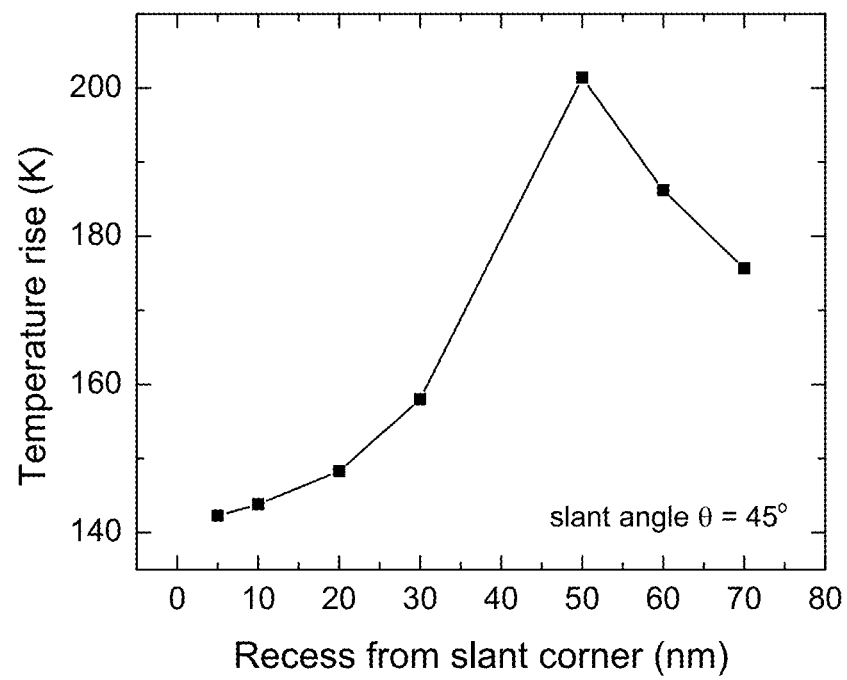

The graphs in FIGS. 16-18 show the calculated simulation results at four slant angles: $\theta$=75°, 60°, 45°, and 30° and at $H_{1NR}$=0. Similar to the previous embodiments ($\theta$=90°), there is longitudinal resonance. Increasing the slant also increases the optimal nanorod length (defined at the top surface of nanorod), $L_{NR}$, with only slight penalty in TG. Note that the optimal $L_{NR}$ increases with the slant but the nanorod length at the bottom surface of the nanorod is some or less fixed at 105 nm (the optimal value if no slant). The graphs in FIGS. 19-21 show the calculated result as the slant corner recesses while leaving a void behind for the case of $\theta$=45°. The initial for these examples is $L_{NR}$=175 nm. Note that the thermal gradient increases as the recess reaches 70 nm, which is desired. The increase in the nanorod end temperature is due to the reduced contact area between the surface plasmonic plate and the nanorod as well as the increased thermal gradient.

Figure 22:
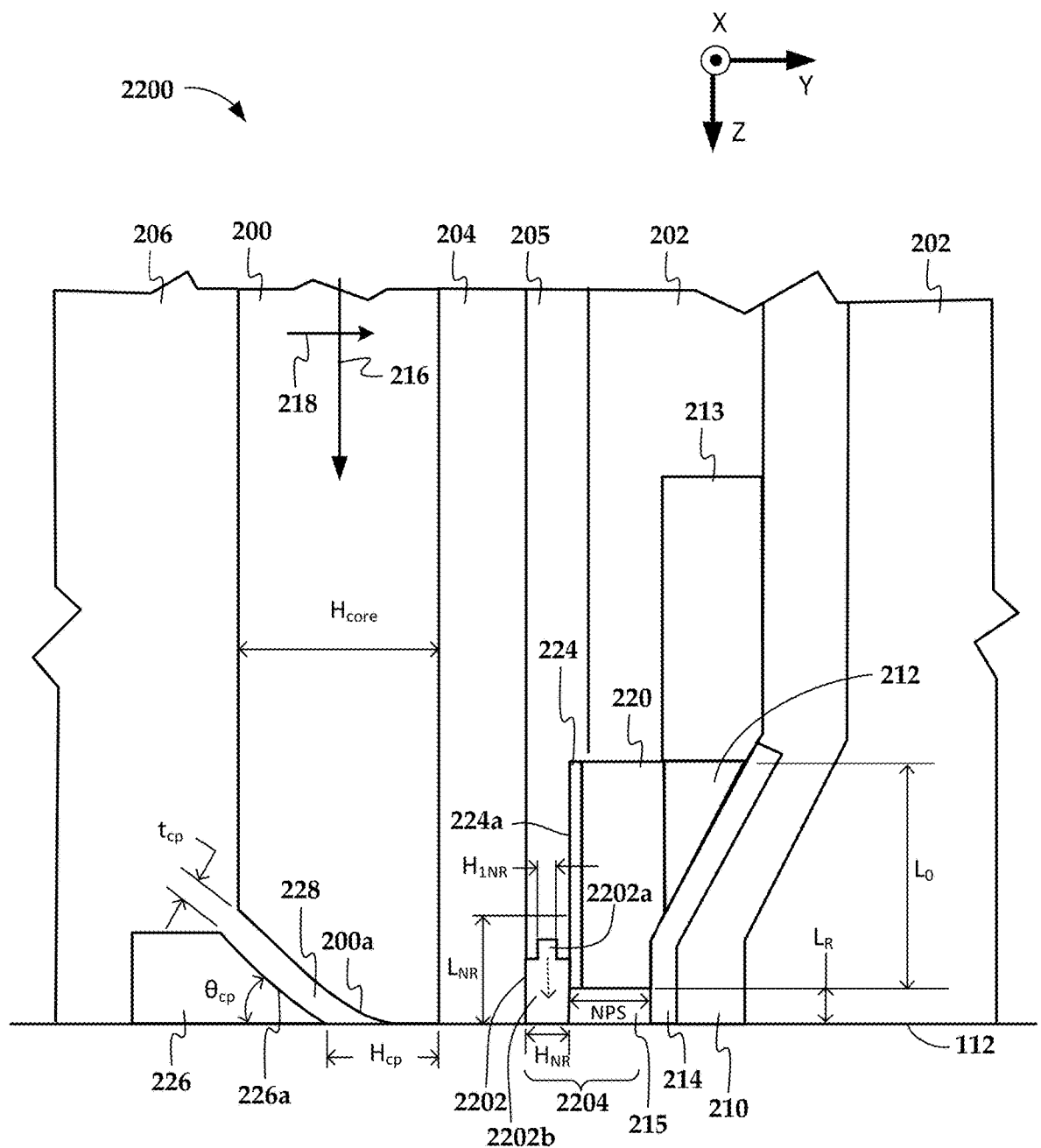
FIG. 22 is a cross-sectional view of a slider along a down-track plane according to according to another example embodiment.

In FIG. 22, a diagram shows an alternate arrangement of a head 2200 according to another example embodiment. For purposes of convenience, some components in FIG. 22 have the same numbering as similar components in FIGS. 2 and 3, and so the description above is applicable to the types and configurations of those components unless otherwise noted. As seen in FIG. 22, an NFT 2204 has a nanorod 2202 with a central protrusion 2202a that extends from a middle of the nanorod body 2202b from an edge that faces away from the media-facing surface 112. Near the resonance of the nanorod 2202 at certain length, light is strongly absorbed in the protrusion 2202a. The induced high temperature rise in the protrusion 2202a will quickly recess into the main body 2202b, resulting in nanorod densification.

Figure 23:
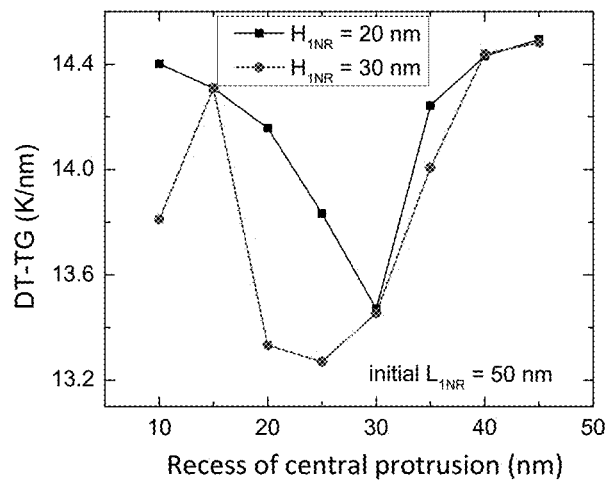
FIGS. 23-25 are graphs showing modeling results of the near-field transducer shown in FIG. 22.
Figure 24:
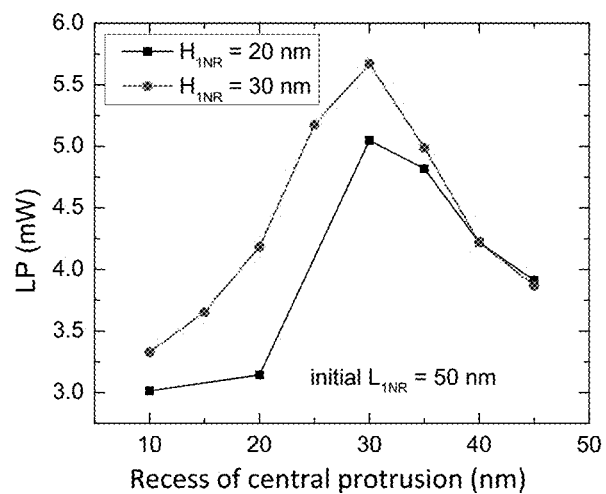
Figure 25:
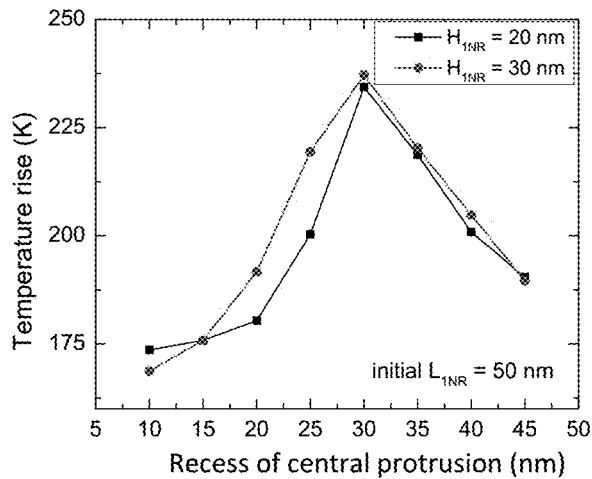

The graphs in FIGS. 23-24 show the modeling result as the central protrusion 2202a recess, using the same parameters/assumptions that were used in the modeling of the embodiment shown in FIG. 15 unless otherwise noted. The central protrusion 2202a is assumed to be 10 nm from the surface plasmonic plate and diffusion barrier 220, 224 and $H_{1NR}$=20 or 30 nm thick. The initial $L_{1NR}$=50 nm long. The central protrusion 2202a is resonant at $L_{1NR}$~20 nm, which corresponds to a ~30 nm recess. The presence of the central protrusion 2202a causes high temperature rise, in particular, near resonance. The central protrusion 2202a will be quickly recessed, densifying the nanorod 2202. After the recess, the temperature of the nanorod drops to the level at normal operation.

Figure 26:
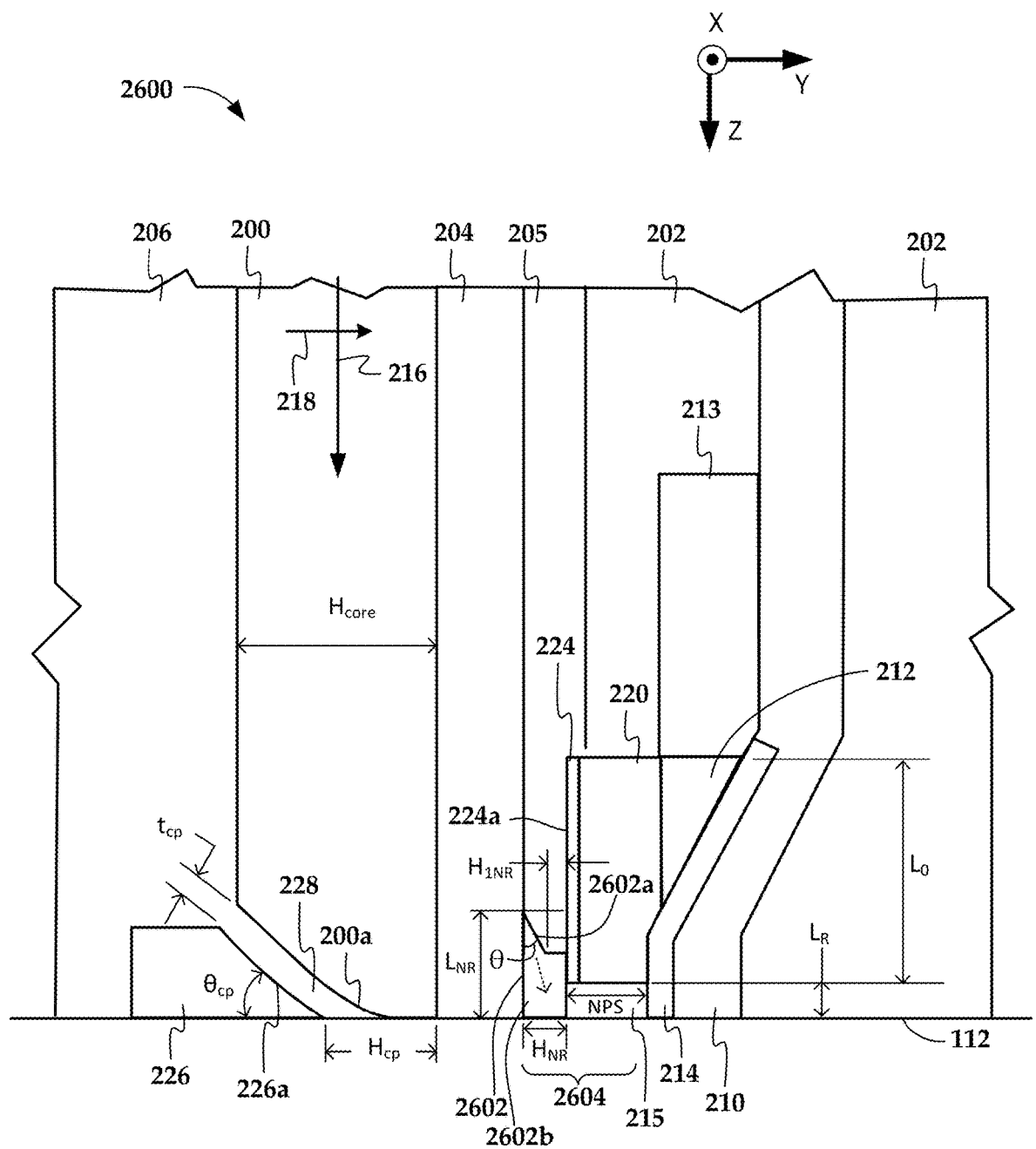
FIG. 26 is a cross-sectional view of a slider along a down-track plane according to according to another example embodiment.

In FIG. 26, a diagram shows an alternate arrangement of a head 2600 according to another example embodiment. For purposes of convenience, some components in FIG. 22 have the same numbering as similar components in FIGS. 2 and 3, and so the description above is applicable to the types and configurations of those components unless otherwise noted. As seen in FIG. 26, an NFT 2604 has a nanorod 2602 with a sloped protrusion 2602a on a side that faces away from the diffusion barrier plate 224 and surface plasmon plate 220. Near the resonance of the nanorod 2602 at certain length, light is strongly absorbed in the protrusion 2602a. The induced high temperature rise in the protrusion 2602a will quickly recess into the main body 2602b, resulting in nanorod densification.

Figure 27:
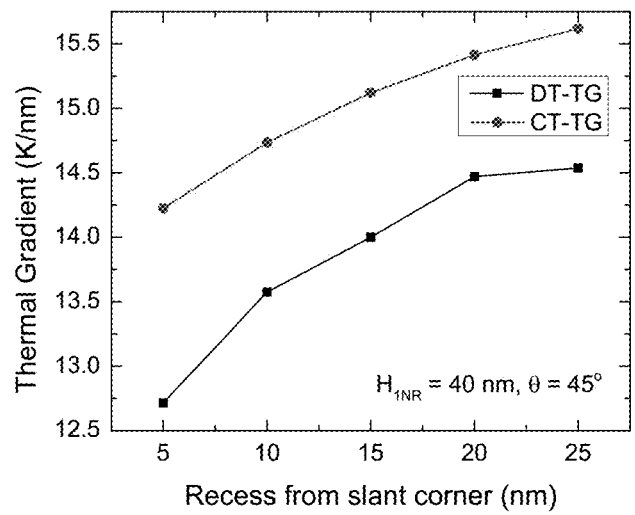
FIGS. 27-29 are graphs showing modeling results of the near-field transducer shown in FIG. 26.
Figure 28:
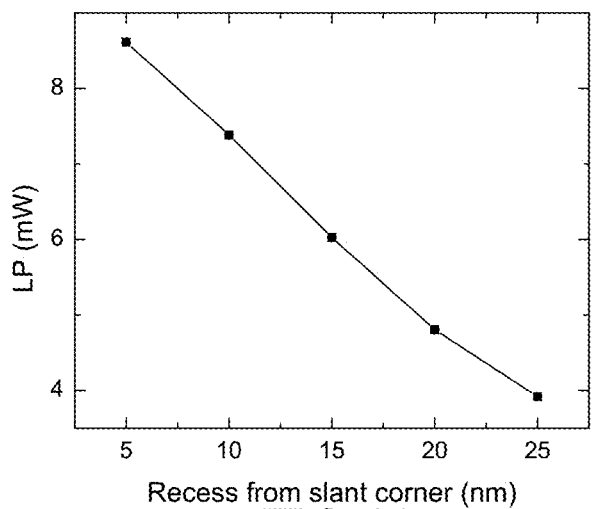
Figure 29:
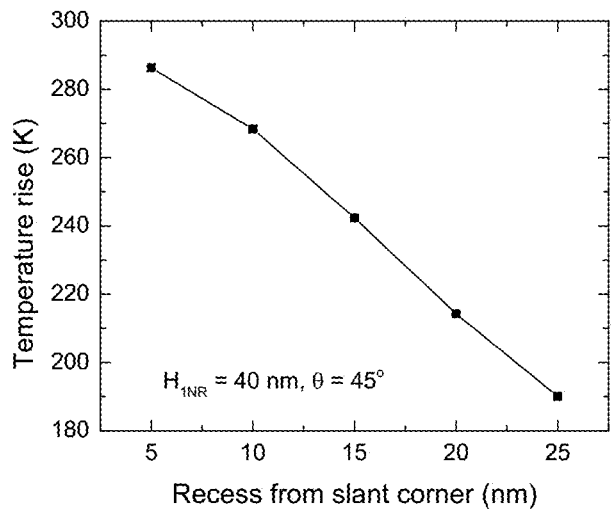

The graphs in FIGS. 27-29 show the results from modeling the configuration in FIG. 26 using the same parameters/assumptions that were used in the modeling of the embodiment shown in FIG. 15, unless otherwise noted. In this modeling, $H_{1NR}$=40 nm, $\theta$=45°. Compared to the case with slant corner at the surface near the surface plasmon plate 220 shown in FIG. 15, this embodiment may higher negative consequence, unless the recess of slant corner is nearly full. A slanted nanorod induces ~100K additional temperature rise if at the laser power for writing a track. This may trigger Au recess from the sharp corner.

In summary, an alternative practical near-field transducer for reliability and high thermal gradient is described. The near-field transducer has a protruded isolated nanorod. A low-loss surface plasmonic nanorod is attached to the bottom of a low-loss surface plasmonic plate, separated by a mechanically robust plasmonic diffusion barrier layer. The near-field transducer is excited by a transverse magnetic waveguide mode ($TM_{00}$). The longitudinal and transverse resonance of the nanorod, funnel coupler and optical side shield render its high performance. Additional nanorod features (e.g., protrusions) may be used to mitigate the nanorod recess from media-facing surface, which densify the nanorod by intended recess at the start of the nanorod. These include a slanted nanorod with sharp corner at its top surface or its bottom surface and a central protrusion.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A recording head, comprising:
a write pole tip that extends to a media-facing surface,
a heat sink that is thermally coupled to a side of the write pole tip;
a surface plasmonic plate in contact with a side of the heat sink that faces away from the write pole, the surface plasmonic plate recessed from the media-facing surface;
a plasmonic diffusion barrier plate on a side of the surface plasmonic plate that faces away from the heat sink, the plasmonic diffusion barrier plate formed of a material that is more mechanically robust than that of the surface plasmonic plate; and
a nanorod extending from a surface of the plasmonic diffusion barrier plate that faces away from the surface plasmonic plate, the nanorod extending towards the media-facing surface and formed of a different material than that of the plasmonic diffusion barrier plate.

2. The recording head of claim 1, wherein the heat sink is recessed from the media-facing surface by a first distance, wherein the nanorod extends from the media-facing surface by less than the first distance.

3. The recording head of claim 1, wherein the nanorod extends from the media-facing surface by a distance $L_{NR}$ and wherein the surface plasmonic plate and the plasmonic diffusion barrier plate are recessed from the media-facing surface by a distance $L_R$, wherein $10*L_R > L_{NR} > L_R$.

4. The recording head of claim 1, wherein the nanorod and the surface of the plasmonic diffusion barrier plate are covered by a dielectric.

5. The recording head of claim 1, wherein the surface plasmonic plate and the plasmonic diffusion barrier plate have matching peripheral shapes on substrate-parallel planes.

6. The recording head of claim 1, wherein the plasmonic diffusion barrier plate has a peripheral shape on a substrate-parallel plane that is smaller than that of the surface plasmonic plate.

7. The recording head of claim 1, wherein the surface plasmonic plate and the plasmonic diffusion barrier plate have parabolic shapes on substrate parallel planes.

8. The recording head of claim 1, wherein the plasmonic diffusion barrier plate is formed of at least one of Rh, Ir, Pt, Pd, metal nitrides, and graphene, and wherein the surface plasmonic plate and the nanorod are formed of at least one of Au, Au-alloys, Ag, and Cu.

9. The recording head of claim 1, further comprising:
a waveguide core facing an edge of the nanorod that faces away from the plasmonic diffusion barrier plate, the waveguide core comprising a terminating end surface at a non-zero angle to the media-facing surface and facing away from the nanorod; and
a funnel coupler having a reflective surface facing and parallel to the terminating end surface of the waveguide core and separated therefrom by a dielectric gap.

10. The recording head of claim 1, wherein the nanorod has a trapezoidal profile in a plane parallel to the media-facing surface, a top side of the trapezoidal profile facing and in contact with the plasmonic diffusion barrier plate, a bottom side facing away from the top side, the top side being shorter than the bottom side.

11. A method comprising:
coupling light from a waveguide to a near-field transducer near a media-facing surface of a recording head, the near-field transducer having a plasmonic diffusion barrier plate that is stacked on a surface plasmonic plate on a plane normal to the media-facing surface, a bottom surface of the plasmonic diffusion barrier plate facing the waveguide and formed of a material that is more mechanically robust than that of the surface plasmonic plate;
in response to the coupling of the light to the near-field transducer, propagating surface plasmons at the bottom surface of the plasmonic diffusion barrier plate, causing the surface plasmons to be concentrated at a narrowed end of the plasmonic diffusion barrier plate that faces the media-facing surface; and
exciting a nanorod with the concentrated surface plasmons, the nanorod stacked on the bottom surface of the plasmonic diffusion barrier plate and extending towards the media-facing surface, the excited nanorod directing the concentrated surface plasmons out of the media-facing surface to heat a recording medium.

12. The method of claim 11, wherein exciting the nanorod comprises exciting a longitudinal resonance in the nanorod.

13. The method of claim 12, further comprising relaxing the longitudinal resonance via a funnel coupler having a reflective surface facing and parallel to a terminating end surface of a core of the waveguide and separated therefrom by a dielectric gap, the terminating end surface of the core at a non-zero angle to the media-facing surface and facing away from the nanorod.

14. The method of claim 11, wherein exciting the nanorod comprises exciting a transverse resonance in the nanorod that pushes the concentrated surface plasmons to a surface of the nanorod that faces the waveguide.

15. The method of claim 11, wherein the nanorod comprises a trapezoidal profile in a plane parallel to the media-facing surface, a shorter side of the trapezoidal profile facing and in contact with the plasmonic diffusion barrier plate, the trapezoidal profile causing the transverse resonance in the nanorod.

16. A recording head comprising:
a write pole tip that extends to a media-facing surface;
a heat sink that is thermally coupled to a side of the write pole tip between the write pole tip and waveguide core; and
a near-field transducer comprising a nanorod extending towards the media-facing surface and stacked on a surface plasmonic plate of the near-field transducer, the surface plasmonic plate in contact with the heat sink, the nanorod comprising a body and a protrusion extending from an edge of the body that faces away from the media-facing surface, the protrusion having a downtrack thickness that is less than that of the body, the protrusion being absorbed into the body in response to a high temperature and reducing a recess of the body from the media-facing surface in response to the high temperature.

17. The recording head of claim 16, wherein the protrusion comprises a sloped protrusion.

18. The recording head of claim 17, wherein the protrusion is on a side of the nanorod that faces the surface plasmonic plate.

19. The recording head of claim 16, wherein the protrusion comprises a central protrusion that extends from a middle of the body.

20. The recording head of claim 16, further comprising a plasmonic diffusion barrier plate between the nanorod and the surface plasmonic, the plasmonic diffusion barrier plate formed of a material that is more mechanically robust than that of the surface plasmonic plate and the nanorod.

* * * * *